(12) United States Patent
Mercurio

(10) Patent No.: US 10,497,059 B1
(45) Date of Patent: Dec. 3, 2019

(54) METHOD AND SYSTEM FOR PROVIDING REAL TIME ACCESS TO RELEVANT ENERGY POLICY AND REGULATORY DATA

(71) Applicant: EnerKnol Inc., Brooklyn, NY (US)

(72) Inventor: Angelique Mercurio, New York, NY (US)

(73) Assignee: Enerknol, Inc., Brooklyn, NY (US)

( * ) Notice: Subject to any disclaimer, the term of this patent is extended or adjusted under 35 U.S.C. 154(b) by 732 days.

(21) Appl. No.: 15/201,486

(22) Filed: Jul. 3, 2016

Related U.S. Application Data

(60) Provisional application No. 62/188,655, filed on Jul. 4, 2015.

(51) Int. Cl.
*G06Q 40/04* (2012.01)
*G06Q 50/26* (2012.01)

(52) U.S. Cl.
CPC ............. *G06Q 40/04* (2013.01); *G06Q 50/26* (2013.01)

(58) Field of Classification Search
CPC ............................... G06Q 40/00; G06Q 40/04
USPC ......................................................... 705/37
See application file for complete search history.

(56) References Cited

U.S. PATENT DOCUMENTS

| | | | |
|---|---|---|---|
| 7,676,559 B2 | 3/2010 | Cuervo | |
| 7,734,750 B2 | 6/2010 | Cannon et al. | |
| 2006/0100912 A1 | 5/2006 | Kumar et al. | |
| 2011/0320395 A1* | 12/2011 | Dada | G06Q 30/02 706/47 |
| 2012/0278469 A1 | 11/2012 | Cannon et al. | |
| 2014/0164380 A1* | 6/2014 | Pavlov | G06F 16/951 707/737 |
| 2016/0205138 A1 | 7/2016 | Krishnaprasad | |

* cited by examiner

*Primary Examiner* — Robert R Niquette
*Assistant Examiner* — Liz P Nguyen

(57) ABSTRACT

A computer-implemented method and system for providing real time access to relevant energy policy and regulatory data. The computer-implemented method includes extracting data from a plurality of website that provides servicing energy stakeholders. The computer-implemented method also includes aggregating the data to a specific website. Further, the method includes creating a list of keywords to count the frequency of words that indicate correlations of interest among different documents. Furthermore, the computer-implemented method includes filtering the data aggregated using the keywords. Moreover, the computer-implemented method includes providing real time access to relevant energy policy and regulatory data thereby allowing customers to efficiently access data that impacts market prices and compliance risk.

18 Claims, 3 Drawing Sheets

METHOD AND SYSTEM FOR PROVIDING REAL TIME ACCESS TO RELEVANT ENERGY POLICY AND REGULATORY DATA

TECHNICAL FIELD

Embodiments of the disclosure relate generally to the energy industry. Embodiments relate more particularly for providing real time access to relevant energy policy and regulatory data.

BACKGROUND

The majority of energy market participants still employ basic and manual research tools such as internet searches and spreadsheets to cut through the mountains of data, filings, proposals, rulemakings, applications, presentations, reports and so on. Considering the speed in which an energy trader, analyst or consultant must react to energy markets, the manual research tools is extremely time-consuming and ineffective.

Further, energy markets have been characterized by tariffs and embedded knowledge that makes decision automation difficult.

Today, several companies waste huge amounts of time and money tracking information from regulatory agencies. Currently, banks rely on non-specialized analysts to scour fragmented information sources, sifting through thousands of pages of research and legislation, which differ by office and sector. Many companies do not have timely access to policy information that enables them to make more successful trade and investment decisions. To gain competitive edge, energy and commodities departments often outsource policy questions to expert consultants, law firms, or lobbyists based in Washington D.C.

From a compliance standpoint, highly regulated energy companies do not have access or robust understanding of all the regulations that impact their business. Because of recent increase in regulations, it is more important than ever for traders and analysts, not just the compliance department, to have more intimate knowledge of policy.

The drawbacks of regulatory information services and newswires include the fact that they don't natively understand the market impacts. The drawbacks of consultants and specialty research publishers are extreme high costs and information delay. Further, in regulated energy markets, price and products often are defined by complex tariffs, derived through political processes.

In the light of the above discussion, there appears to be a need for providing real time access to relevant energy policy and regulatory data.

OBJECT OF INVENTION

The principal object of the embodiments herein is to provide an online platform to provide real time access to relevant energy policy and regulatory data and monitoring its movements. Consequently, customer processes are simplified and streamlined enabling efficient access to data that impacts market prices and compliance risk.

Another object of the embodiments herein is to allow the automated real time access to be used for a wide range of additional service product categories. More value-added services can be included to further personalize the monitoring and relevant policy data movement's experience. For instance, all businesses with a regulated or contractual frequency regulation service process would benefit from the automation and standardization offered by this process.

Another object of the embodiments herein is to provide an automated system that can make decisions to optimize energy and economic results when subjected to inputs of price and product.

Another object of the embodiments herein is to provide real time access to relevant energy policy and regulatory data.

Another object of the embodiments herein is to monitor changes and subsequently report the changes.

SUMMARY

The above-mentioned needs are met by a computer-implemented method, computer program product and system for providing real time access to relevant energy policy and regulatory data.

A computer-implemented method to provide real time access to relevant energy policy and regulatory data includes extracting data from a plurality of website that provides servicing energy stakeholders. The computer-implemented method also includes aggregating the data to a specific website. Further, the computer-implemented method includes creating a list of keywords to count the frequency of words that indicate correlations of interest among different documents. Furthermore, the computer-implemented method includes filtering the data aggregated using the keywords. Moreover, the computer-implemented method includes providing real time access to relevant energy policy and regulatory data thereby allowing customers to efficiently access data that impacts market prices and compliance risk.

An example of a computer program product to provide real time access to relevant energy policy and regulatory data includes extracting data from a plurality of website that provides servicing energy stakeholders. The computer program product also includes aggregating the data to a specific website. Further, the computer program product includes creating a list of keywords to count the frequency of words that indicate correlations of interest among different documents. Furthermore, the computer program product includes filtering the data aggregated using the keywords. Moreover, the computer program product includes providing real time access to relevant energy policy and regulatory data thereby allowing customers to efficiently access data that impacts market prices and compliance risk.

An example of a system providing real time access to relevant energy policy and regulatory data includes one or more dashboards and an API that provides a range of interactivity thereby providing a range of interactivity between the Dashboard and the web applications. Further, the system includes Data Feeds and Scrapers. Furthermore, the system includes a database that stores inputs derived from sources of API's, Data Feeds and Scrapers. Moreover, the system includes a processor coupled within the dashboard and configured to perform the method of: extract data from a plurality of website that provides servicing energy stakeholders; aggregate the data to a specific website; create a list of keywords to count the frequency of words that indicate correlations of interest among different documents; filter the data aggregated using the keywords to extract insignificant data points; and provide real time access automatically to relevant energy policy and regulatory data thereby allowing customers to efficiently access data that impacts market prices and compliance risk.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method and system for providing real time access to relevant energy policy and regulatory data. The following detailed description is intended to provide example implementations to one of ordinary skill in the art, and is not intended to limit the invention to the explicit disclosure, as one or ordinary skill in the art will understand that variations can be substituted that are within the scope of the invention as described.

The system described herein is referred to as the "Big Data Platform". The Big Data Platform energy domain is extensive and multidisciplinary. The proprietary information that may be generated by the system of the present invention is superior in many ways to the limited, and generally static, energy policy data and databases heretofore known in the art.

Environment Diagram

Figure 1:
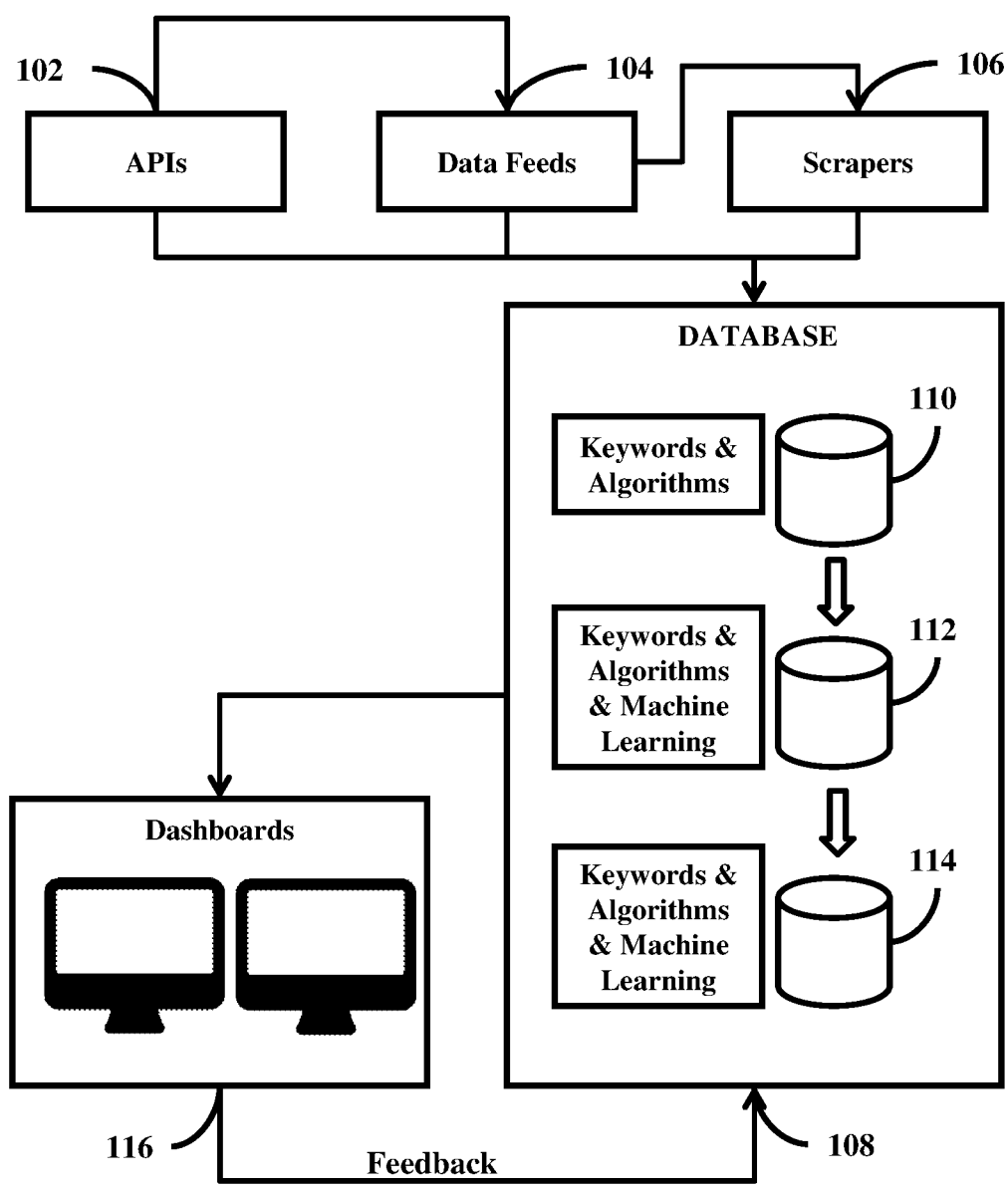
FIG. 1 is a block diagram of the environment, according to the embodiments as disclosed herein.

FIG. 1 is a block diagram of the environment, according to the embodiments as disclosed herein. The environment 100 includes an Application Programming Interfaces (APIs) 102, Data Feeds 104, Scrapers 106, database 108 and dashboards 116. Further, the database 108 includes Policy Filings Collection 110, Energy Market Relevance Identification 112 and Energy Sector Categorization & Policy Impact Analysis 114.

The inputs to the database 108 are obtained from Government Agencies and other primary sources of regulatory information, press and news releases, filings, and other text and numerical publications. Typically, the inputs are derived from the sources of APIs 102, Data Feeds 104 and Scrapers 106. The APIs 102 are wrapped around the database 108 to make fetching data consistent around other projects. The Scrapers 106 are responsible to fetch information on a daily basis from federal, regional, state and local government offices. The Energy Market Relevance Identification 112 utilizes a set of keywords to tag regulatory and legislative filings and subsequently assign them to one or more defined commodities.

The database 108 filters the inputs (herein referred to as "data"). The data is filtered by a specific set of keywords that extracts insignificant data points.

The feedback is sent from the dashboards 116 to database 108. The users receive updates on tracked regulations when available in the database 108. The dashboards 116 are user customizable profiles displaying energy policy filings and related information according to provided criteria. In other words, the dashboards 116 include a user frontend panel and an admin panel that can be used to access the data on a web interface. Users receive updates on tracked regulations when available in the data store.

Further, web developers can integrate Energy Policy data into web applications through the new JavaScript API. The API provides a range of interactivity in the dashboard 116. Consequently, there is a high level of interactivity between the dashboard 116 and the web applications.

Through operation of system described herein, the Energy Policy data filtered and extracted from the database 108 is analyzed by suitable programming of a processor to product useful event and/or commercial information. The event and/or commercial information is stored in an information virtual hybrid Cloud storage and virtual private storage array (VPSA) technology device and within the the Big Data Platform exists the Platform Database 108 which contains Keywords, Algorithms and Machine Learning consisting of Policy Filings Collection 110, Energy Market Relevance Identification 112, Energy Sector Categorization and Policy Impact Analysis 114 providing real time access to concise, actionable energy policy data for cross-sector market participants.

The Database platform API 108 enables decision making in the energy domain based on a standardized real-time Database as a Service (DBaaS) multi-task, multi-source, multi-segmented stream classification platform and real-time energy policy streaming data utilizing Big Data system models built using patterns from historical energy policy data, energy policy document entity linking and policy event correlation engine for situation refinement, deliver information and services that are relevant and immediate.

At least one policy event data source comprises keywords data from a plurality of different sources including the monitoring of complex hybrid cloud virtual systems 110, the monitoring of energy flow on transmission and distribution grids, the forecasting of energy demand and renewable energy production, the monitoring and optimizing energy management systems and the collection and analysis of data with high diversity (socioeconomic, geospatial etc) for energy policy support, content based and collaborative filtering based recommendation and personalization engine implementation. The database 108 requires the exploitation of the latest available technological advances in data management and processing and in respect to energy industry products in particular, the volume of data and the degree to which the policy data may be stratified and studied, the systems according to the invention far exceed the industry capabilities for energy policy, regulatory and compliance one-stop highly distributed online energy products.

Operational Flow Diagram

Figure 2:
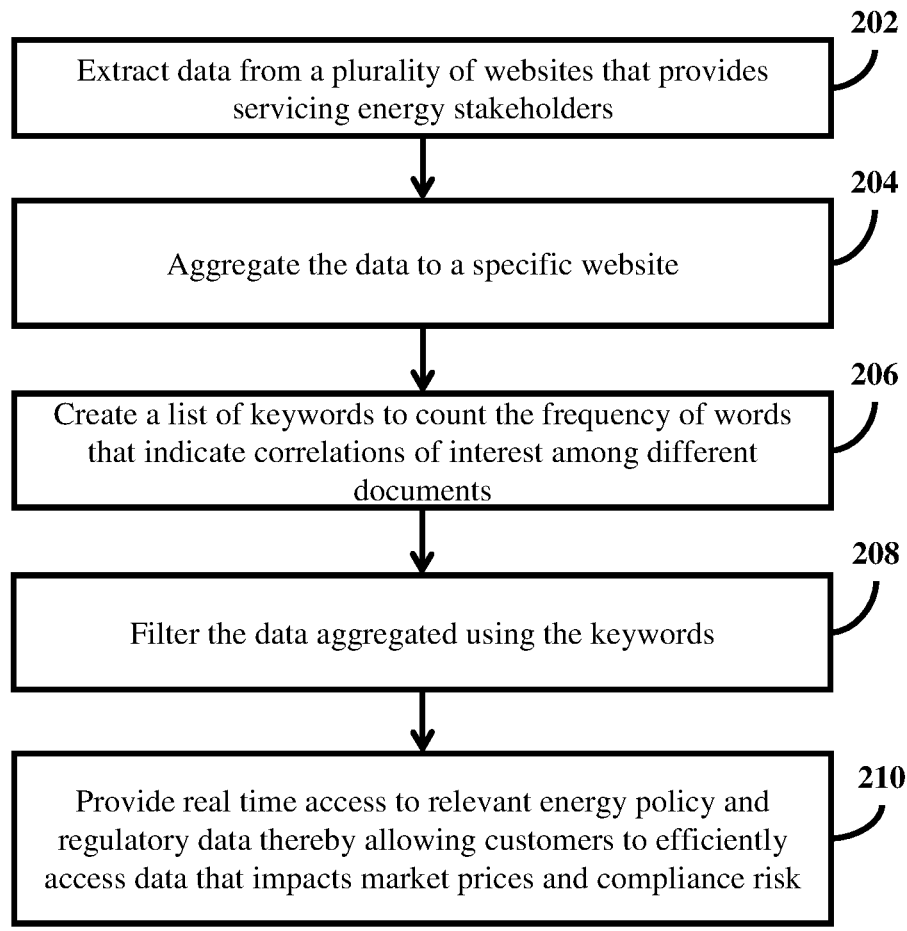
FIG. 2 is a flow chart a method for providing real time access to relevant energy policy and regulatory data, according to the embodiments as disclosed herein.

FIG. 2 is a flow chart describing a method for providing real time access to relevant energy policy and regulatory data, according to the embodiments as disclosed herein. The method begins at step 202.

At step 202, data is extracted from a plurality of website that provides servicing energy stakeholders. The websites service energy stakeholders.

Typically, web data is available in several formats and structures. Natural Language Processing (NLP) is used to extract the data. In a specific embodiment, web crawlers are used to extract the data. Specifically, the data are passed through a file extraction pipeline (everyday) in order to convert the data to text files.

An Application Programming Interface (API) is built and maintained on the host site.

At step 204, the data is aggregated to a specific website. The quality of data that is extracted by the web crawlers includes standard error analysis for sensitivity and specificity as defined below:

$$Precision = \frac{cardinality((relevant\ documents) \cap (retrieved\ documents))}{cardinality((retrieved\ documents))}$$

$$Recall = \frac{cardinality((relevant\ documents) \cap (retrieved\ documents))}{cardinality((relevant\ documents))}$$

At step 206, a list of keywords is created to count the frequency of words that indicate correlations of interest among different documents. Generally, the keywords are created by a group of experts. The list of keywords is used as a standard template to count the frequency of words that indicate correlations of interest among different documents.

An exemplary content is shown below signifying the words in bold as relevant keywords within the text.
Date: Jan. 31, 2014
Title: HOUSE BILL NO. 1664
State: Missouri
Type of Action: Introduced Rule
Agency: Missouri House of Representatives
url: http://www.house.mo.gov/billtracking/bills141/biltxt/intro/HB1664I.htm
Text: "AN ACT To repeal sections 393.1030 and 393.1075, RSMo, and to enact in lieu thereof two new sections relating to solar energy rebates . . . . At least two percent of each portfolio requirement shall be derived from solar energy. The portfolio requirements shall apply to all power sold to Missouri consumers whether such power is self-generated or purchased from another source in or outside of this state. A utility may comply with the standard in whole or in part by purchasing RECs. Each kilowatt-hour of eligible energy generated in Missouri shall count as 1.24 kilowatt-hours for purposed of compliance. As provided for in this section, except for those electrical corporations that qualify for an exemption under section 393.1050, each electric utility shall make available to its retail customers a solar rebate for new or expanded solar electric systems sited on customers' premises, up to a maximum of twenty-five kilowatts per system, measured in direct current that were confirmed by the electric utility to have become operational in compliance with the provisions of section 386.890 . . . ."

At step 208, the aggregated data is filtered using the keywords.

The extracted data may include noise and artifacts, such as HTML, which is removed using the keywords. Unstructured data is then tagged with other policy-relevant information.

At step 210, real time access is provided to relevant energy policy and regulatory data thereby allowing customers to efficiently access data that impacts market prices and compliance risk. Normalized policy data is displayed on a web-based platform.

Typically, the method allows market participants to effectively access, track and understand regulatory and policy information. Thereby, there is a competitive edge and insight into data and compliance risk mitigation. Consequently, time and money is saved.

The method ends at step 210.

The method described herein is beneficial in the following ways:
1. Provides an online, real time access to data.
2. Automatically filtering out non-relevant filings by the keyword categorization process.
3. Provides a quick access to unstructured data in an intuitive manner.

Further, the method and system described herein enables the following:
1. Real time access to energy policy, regulatory and compliance data and tariffs.
2. Electronic submission of additional documentation that supports a specific policy through sentiment analysis.
3. Unique identification of each subscriber and secured storage of subscriber data.
4. Proprietary algorithms batch data processing pipeline allows extraction of data from multi-structured policy and tariff forms into the system Research Linker format (Linking brief reports with the scraped data), providing standardized policy data presentation to industry experts.
5. Accurate and specific regulatory rules and regulations pertinent to an Energy Policy and its processing as published by local, state and Federal regulatory agency.
6. Regularly notifying each subscriber, during the Policy process, via email of the most current status and regulatory options specific to their policies.
7. Aggregates data and Energy Sector Categorization, Policy Impact Analysis along with user information presents profiles of the subscriber's policy submissions, interactions, performance, and history at multiple levels of detail. Information exchanged between the system and the subscriber are accomplished according to the most current standards based on information exchange, providing real time access to energy policy, regulatory and compliance, tariffs, et all data enabling comprehensive policy data access that impacts market prices and compliance risk analysis.

System Block Diagram

Figure 3:
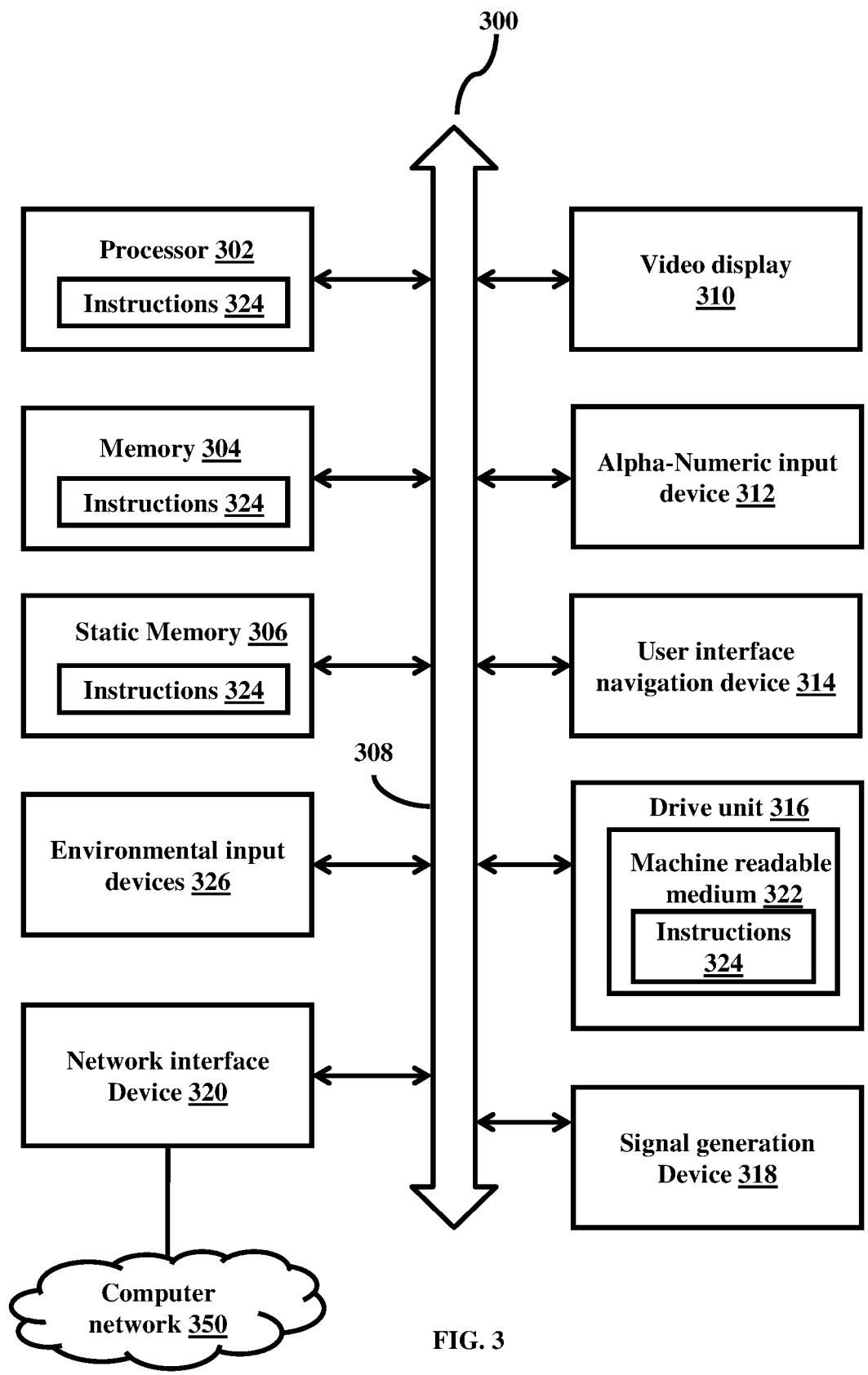
FIG. 3 is a block diagram of a machine in the example form of a computer system within which instructions for causing the machine to perform any one or more of the methodologies discussed herein may be executed.

FIG. 3 is a block diagram of a machine in the example form of a computer system 300 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU), or both), a main memory 304, and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker), and a network interface device 320. The computer system 300 may also include a environmental input device 326 that may provide a number of inputs describing the environment in which the computer system 300 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions 324 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 324 may further be transmitted or received over a computer network 350 using a transmission medium. The instructions 324 may be transmitted using the network interface device 320 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for providing real time access to relevant energy policy and regulatory data, the method comprises:
   extracting data from a plurality of websites that provides servicing energy stakeholders;
   converting the extracted data into a standard text file format;
   aggregating the data to a specific website;
   creating a list of keywords to count the frequency of words that indicate correlations of interest among different documents, wherein the keywords are created by a group of experts;
      filtering the data aggregated using the keywords to extract insignificant data points;
   providing real time access automatically to relevant energy policy and regulatory data thereby allowing customers to efficiently access data that impacts market prices and compliance risk; and
   monitoring changes in the extracted data and subsequently reporting the changes in the relevant energy policy and regulatory data provided to the customers.

2. The computer-implemented method of claim 1 and further comprising:
   integrating Energy Policy data into web applications through a new JavaScript API.

3. The computer-implemented method of claim 1 and further comprising:
   obtaining inputs to the Database from Government agencies and other primary sources of regulatory information, press and news releases, filings and other text and numerical publications.

4. The computer-implemented method of claim 1 wherein quality of the data extracted includes standard error analysis for sensitivity and specificity.

5. The computer-implemented method of claim 1 wherein the list of keywords is used as a standard template to count the frequency of words that indicates correlations of interest among different documents.

6. The computer-implemented method of claim 1 and further comprising:
   removing noise and artifacts in the extracted data using the list of keywords;
      tagging the unstructured data with other policy-relevant information; and
      displaying normalized policy data on a web-based platform.

7. The computer-implemented method of claim 1 and further comprising:
   storing event and commercial information in an information virtual hybrid cloud storage and virtual private storage array (VPSA) technology device.

8. A non-transitory computer-readable storage medium having stored thereon computer-executable instructions, that when executed by a processor, cause a computer to perform operations comprise:
   extracting data from a plurality of website that provides servicing energy stakeholders;
   converting the extracted data into a standard text file format;
   aggregating the data to a specific website;
   creating a list of keywords to count the frequency of words that indicate correlations of interest among different documents, wherein the keywords are created by a group of experts;
   filtering the data aggregated using the keywords to extract insignificant data points;
   providing real time access automatically to relevant energy policy and regulatory data thereby allowing customers to efficiently access data that impacts market prices and compliance risk; and
   monitoring changes in the extracted data and subsequently reporting the changes in the relevant energy policy and regulatory data provided to the customers.

9. The non-transitory computer-readable storage medium of claim 8, wherein the operation further comprising:
   integrating Energy Policy data into web applications through a new JavaScript API.

10. The non-transitory computer-readable storage medium of claim 8, wherein the operation further comprising:
   obtaining inputs to a Database from Government agencies and other primary sources of regulatory information, press and news releases, filings and other text and numerical publications.

11. The non-transitory computer-readable storage medium of claim 8 wherein quality of the data extracted includes standard error analysis for sensitivity and specificity.

12. The non-transitory computer-readable storage medium of claim 8 wherein the list of keywords is used as a standard template to count the frequency of words that indicates correlations of interest among different documents.

13. The non-transitory computer-readable storage medium of claim 8, wherein the operation further comprising:
   removing noise and artifacts in the extracted data using the list of keywords;
   tagging the unstructured data with other policy-relevant information; and
   displaying normalized policy data on a web-based platform.

14. The non-transitory computer-readable storage medium of claim 8, wherein the operation further comprises:
   storing event and commercial information in an information virtual hybrid cloud storage and virtual private storage array (VPSA) technology device.

15. A system for providing real time access to relevant energy policy and regulatory data, the system comprises:
   one or more dashboards;
   an API that provides a range of interactivity thereby providing a range of interactivity between the Dashboard and the web applications;
   Data Feeds;
   Scrapers;
   a database that stores inputs derived from sources of API's, Data Feeds and Scrapers;
   a processor coupled within the dashboard and configured to perform:

extracting data from a plurality of website that provides servicing energy stakeholders;

converting the extracted data into a standard text file format;

aggregating the data to a specific website;

creating a list of keywords to count the frequency of words that indicate correlations of interest among different documents;

filtering the data aggregated using the keywords to extract insignificant data points;

providing real time access automatically to relevant energy policy and regulatory data thereby allowing customers to efficiently access data that impacts market prices and compliance risk; and monitoring changes in the extracted data and subsequently reporting the changes in the relevant energy policy and regulatory data provided to the customers.

16. The system of claim 15 wherein the database further comprising:

Policy Filings Collection;
Energy Market Relevance Identification;
Energy Sector Categorization; and
Policy Impact Analysis.

17. The system of claim 15 wherein the dashboards are user customizable profiles displaying energy policy filings and related information according to provided criteria.

18. The system of claim 15 wherein the system provides a platform to provide real time access to relevant policy and regulatory data and monitoring movements.

* * * * *